(12) United States Patent
Yin et al.

(10) Patent No.: US 11,954,083 B2
(45) Date of Patent: Apr. 9, 2024

(54) CLOTHING INFORMATION PROCESSING METHOD

(71) Applicants: QINGDAO HAIER WASHING MACHINE CO., LTD., Shandong (CN); HAIER SMART HOME CO., LTD., Shandong (CN)

(72) Inventors: Junming Yin, Shandong (CN); Shuai Wang, Shandong (CN); Sheng Xu, Shandong (CN)

(73) Assignees: QINGDAO HAIER WASHING MACHINE CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 224 days.

(21) Appl. No.: 17/606,366

(22) PCT Filed: Apr. 1, 2020

(86) PCT No.: PCT/CN2020/082810
§ 371 (c)(1),
(2) Date: Oct. 25, 2021

(87) PCT Pub. No.: WO2020/216031
PCT Pub. Date: Oct. 29, 2020

(65) Prior Publication Data
US 2022/0229825 A1 Jul. 21, 2022

(30) Foreign Application Priority Data
Apr. 23, 2019 (CN) .......................... 201910330139.5

(51) Int. Cl.
*G06F 16/22* (2019.01)
*D06F 34/18* (2020.01)
(Continued)

(52) U.S. Cl.
CPC .............. *G06F 16/22* (2019.01); *D06F 34/18* (2020.02); *G06F 16/219* (2019.01); *D06F 2105/58* (2020.02)

(58) Field of Classification Search
CPC .................................. G06F 16/22; D06F 34/18
See application file for complete search history.

(56) References Cited

U.S. PATENT DOCUMENTS 9,818,007 B1 * 11/2017 Bajovic .............. G06Q 30/0631
11,753,764 B2 * 9/2023 Krepek ................... D06F 34/18
68/12.02
(Continued)

FOREIGN PATENT DOCUMENTS

| CN | 104947372 A | 9/2015 |
|---|---|---|
| CN | 105342164 A | 2/2016 |

(Continued)

OTHER PUBLICATIONS

International Search Report (PCT/ISA/210) with translation and Written Opinion (PCT/ISA/237) dated Jul. 2, 2020, by the Chinese Patent Office as the International Searching Authority for International Application No. PCT/CN2020/082810. (14pages).

(Continued)

*Primary Examiner* — Merilyn P Nguyen
(74) *Attorney, Agent, or Firm* — BUCHANAN INGERSOLL & ROONEY PC

(57) ABSTRACT

The present disclosure discloses a clothing information processing method, comprises: the server receives the clothing information sent by a washing device and saves it; the server receives request information sent by an intelligent terminal; the server obtains the corresponding clothing information according to the request information and sends it to the intelligent terminal. In this disclosure, the server receives the clothing information sent by the washing device and stores the clothing information. In this way, in the whole (Continued)

washing cycle, even after this washing cycle, the user can obtain the clothing information from the server through the intelligent terminal, which avoids that in the prior art, after the stage of uploading clothing information by the washing device is completed, the intelligent terminal can no longer obtain clothing information.

16 Claims, 1 Drawing Sheet

(51) Int. Cl.
*G06F 16/21* (2019.01)
*D06F 105/58* (2020.01)

(56) References Cited

U.S. PATENT DOCUMENTS

| | | | | |
|---|---|---|---|---|
| 2001/0049846 | A1* | 12/2001 | Guzzi | D06F 34/22 68/17 R |
| 2007/0200870 | A1* | 8/2007 | Jeong | D06F 34/32 345/619 |
| 2008/0196170 | A1* | 8/2008 | Choi | D06F 34/18 68/12.02 |
| 2019/0287153 | A1 | 9/2019 | Shu et al. | |
| 2020/0208319 | A1* | 7/2020 | Lee | D06F 34/32 |
| 2020/0385909 | A1 | 12/2020 | Xu et al. | |

FOREIGN PATENT DOCUMENTS

| | | |
|---|---|---|
| CN | 105405034 A | 3/2016 |
| CN | 105554165 A | 5/2016 |
| CN | 106801314 A | 6/2017 |
| CN | 106991761 A | 7/2017 |
| CN | 109385840 A | 2/2019 |
| CN | 109594298 A | 4/2019 |

OTHER PUBLICATIONS

Office Action dated Apr. 7, 2022, in corresponding Chinese Patent Application No. 201910330139.5. (5 pages).
Office Action dated Jun. 2, 2023, in corresponding Chinese Patent Application No. 201910330139.5. (5 pages).

* cited by examiner

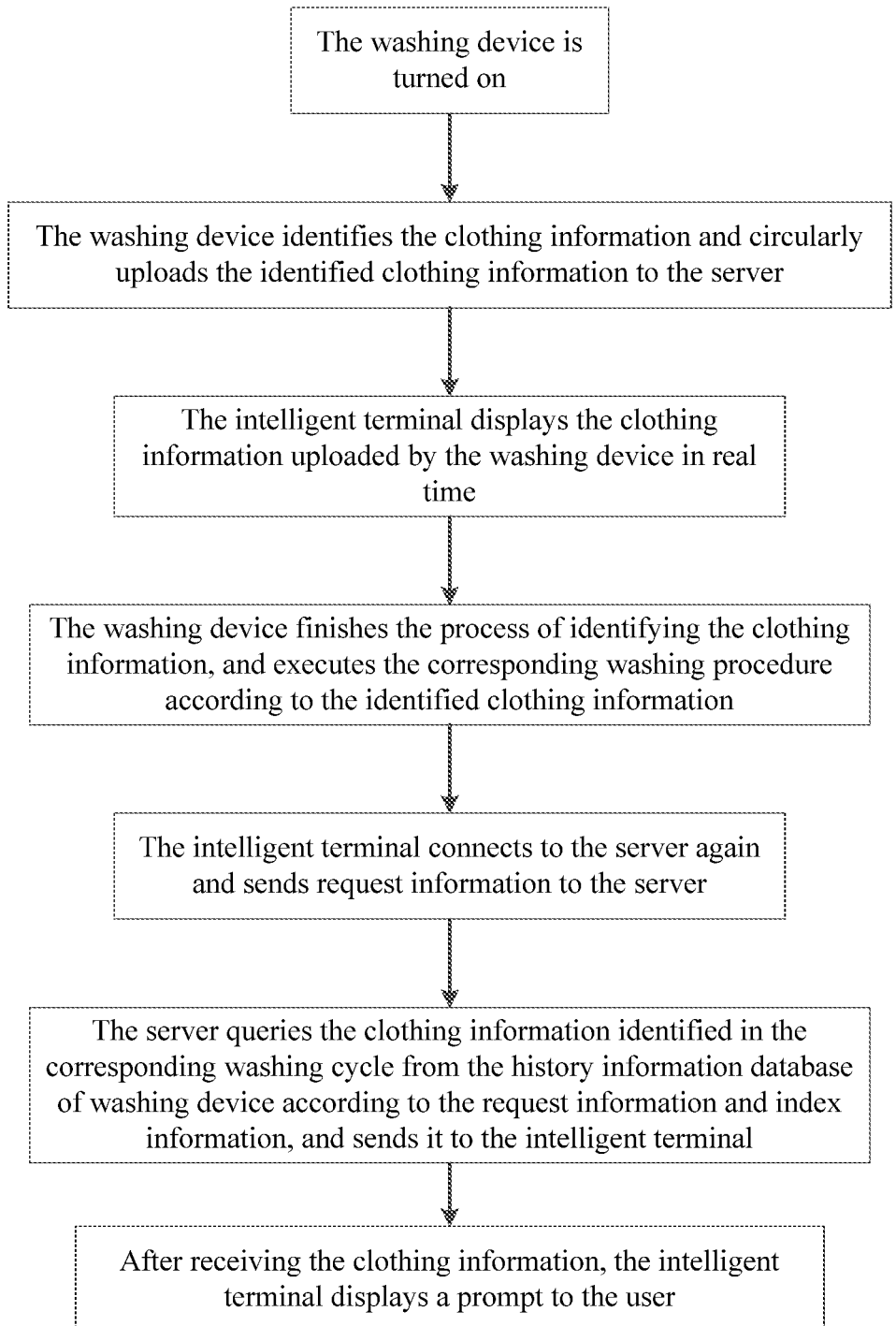

CLOTHING INFORMATION PROCESSING METHOD

TECHNICAL FIELD

This disclosure relates to the field of communication technology equipment, in particular to a clothing information processing method.

BACKGROUND TECHNOLOGY

Now many patents mention the application of clothing identification technology to washing machines to realize intelligent washing processing of clothes. Among them, most schemes are to set a RFID reader on the washing machine. The clothing information stored by the RFID electronic tags is obtained by identifying the RFID electronic tags on the clothes to be washed via the RFID reader, and the washing procedures is recommended according to the clothing information.

Moreover, the washing machine has the function of Internet of things, which uploads the identified clothing information to the server, the user holds an intelligent terminal, and the intelligent terminal is connected with the server in communication. In the process of uploading clothing information from the washing machine to the server, the intelligent terminal can synchronize the clothing information received by the server for users to view. But in the prior art, the server does not have the function of storing clothing information. If the user opens the intelligent terminal after the stage of identifying the clothing information and uploading the clothing information of the washing machine is completed, the intelligent terminal will not be able to obtain the clothing information identified in the current washing cycle after connecting to the server, let alone the function of viewing the clothing information identified in each washing cycle in the later stage.

In view of this, the present disclosure is hereby proposed.

SUMMARY

An object of the present disclosure is to overcome shortcomings of the prior art, and provide a clothing information processing method. After the clothing information is sent to the server by the washing device, it is stored in the server. In the whole washing cycle, even after this washing cycle, the user can obtain the clothing information identified by the washing device from the server through the intelligent terminal.

In order to realize the first object, the present disclosure adopts the following technical solution:

A clothing information processing method comprising:
the server receiving clothing information sent by a washing device and saving it;
the server receiving request information sent by an intelligent terminal;
the server obtaining the corresponding clothing information according to the request information and sending it to the intelligent terminal.

In the above scheme, the server receives the clothing information sent by the washing device and stores the clothing information. In this way, in the whole washing cycle, even after this washing cycle, the user can obtain the clothing information identified by the washing device from the server through the intelligent terminal, which avoids that in the prior art, after the stage of uploading clothing information by the washing device is completed, the intelligent terminal can no longer obtain clothing information.

Preferably, index information is set and stored for the clothing information after the server receiving the clothing information sent by the washing device. When receiving the request information sent by the intelligent terminal, the server obtains the corresponding clothing information according to the index information and sends it to the corresponding intelligent terminal.

In the above scheme, the server sets the index information for the clothing information, so that after the server receives the request information of the intelligent terminal, it can quickly obtain the corresponding clothing information according to the index information.

Preferably, the server receives the clothing information and operation state information uploaded by the washing device, sets the operation state information as the index information of the clothing information. When receiving the request information, the server indexes and queries the corresponding clothing information according to the operation state information index.

Preferably, the server receives real-time operation state information and the identified clothing information uploaded by the washing device, and stores the operation state information and the clothing information in association. When receiving the request information, the server indexes and queries the corresponding clothing information according to the operation state information.

Preferably, the washing device is provided with an operation state for identifying the clothing information. In the operation state, the server receives the real-time operation state information and the identified clothing information uploaded by the washing device, and stores the operation state information and the clothing information in association. When receiving the request information, the server indexes and queries the corresponding clothing information according to the operation state information.

Preferably, the server receives the real-time operation state data frame sent by the washing device and the clothing information field uploaded with the real-time operation state data frame, and stores the received clothing information field in turn. When receiving the request information, the server obtains each clothing information field to obtain all clothing information identified in the washing cycle, and sends it to the intelligent terminal.

Preferably, each time the washing device identifies the clothing information of a piece of clothing, the clothing information is uploaded to the server together with the operation state data frame. The server successively stores all clothing information uploaded by the washing device, and when receiving the request information, indexes and queries the clothing information of each piece of clothing respectively and sends it to the intelligent terminal.

Preferably, the server counts the number of clothes in a process of receiving clothing information. When receiving the request information, the server performs an index query process corresponding times according to the number of clothes to obtain all clothing information in the washing cycle.

Preferably, the server sets ID numbers for the clothing information of each clothes received in turn, so as to traverse the stored clothing information according to the ID number when receiving the request information.

Preferably, when the washing device is in the operation state of identifying clothing information, the server receives the clothing information uploaded by the washing device continuously and circularly. In the operation state, when the server receives the request information of the intelligent terminal, it will directly send clothing information uploaded by the washing device in real time to the intelligent terminal. In this stage, the intelligent terminal obtains the stored clothing information through the corresponding interface.

The server receives the request information after the operation state of identifying the clothing information, then queries the corresponding clothing information from the stored data information and sends it to the intelligent terminal.

The server receives and stores the operation state information and clothing information uploaded by the washing device in each washing cycle, and establishes a historical information database of the washing device. After receiving the request information, the server queries the corresponding clothing information from the historical information database and sends it to the intelligent terminal.

In the above scheme, the server establishes the historical information database of the washing device, which stores the clothing information in each washing cycle. The server can obtain the clothing information of each user's clothes from the historical information database, so as to realize the intelligent management of the user's clothing.

Preferably, the request information comprises identification information and washing cycle information of the washing device, and the server queries the clothing information identified in the corresponding washing cycle of the corresponding washing device from the historical information database according to the request information and the index information.

After the above technical solution is adopted, the present disclosure has the following advantageous effects compared with the prior art.

In this disclosure, the clothing information processing method comprising: the server receiving clothing information sent by a washing device and saving it; the server receiving request information sent by an intelligent terminal; the server obtaining the corresponding clothing information according to the request information and sending it to the intelligent terminal. In this disclosure, the server receives the clothing information sent by the washing device and stores the clothing information. In this way, in the whole washing cycle, even after this washing cycle, the user can obtain the clothing information identified by the washing device from the server through the intelligent terminal, which avoids that in the prior art, after the stage of uploading clothing information by the washing device is completed, the intelligent terminal can no longer obtain clothing information.

Accompanying drawings will be incorporated below to further describe specific embodiments of the present disclosure in details.

BRIEF DESCRIPTION OF THE DRAWINGS

As a part of the present application, accompanying drawings are used for providing a further understanding of the present disclosure, schematic embodiments and descriptions thereof of the present disclosure are used for explaining the present disclosure, rather than constituting an improper limit to the present disclosure. Obviously, accompanying drawings described below are merely some embodiments, for those skilled in the art, other drawings can be obtained based on these drawings without any creative effort. In the drawings:

FIG. 1 is a schematic diagram of a preferred control step of the present disclosure.

It should be noted that, these drawings and text descriptions are not aiming at limiting a conception range of the present disclosure in any form, but to describe concepts of the present disclosure for those skilled in the art with a reference to specific embodiments.

DETAILED DESCRIPTION

In order to make the object, technical solutions and advantages of the present disclosure clearer, a clear and complete description will be given below on technical solutions in the present embodiment in combination with accompanying drawings in embodiments of the present disclosure. The following embodiments are used for describing the present disclosure, rather than for limiting the scope of the present disclosure.

In the description of the present disclosure, it should be noted that, the directional or positional relationship indicated by such terms as "upper", "lower", "front", "rear", "left", "right", "vertical", "inner" and "outer" is the directional or positional relationship shown based on the drawings, which is merely for convenient and simplified description of the present disclosure, rather than indicating or implying that the referred device or element must have the specific direction or must be constructed and operated in the specific direction, therefore, it cannot be understood as a limitation to the present disclosure.

In the description of the present disclosure, it should be noted that, unless otherwise definitely prescribed and defined, the terms "installation", "connected" and "connection" should be understood in its broad sense. For example, the "connection" may be a fixed connection, may also be a detachable connection or an integrated connection; and the "connected" may be directly connected and can also be indirectly connected through an intermediate medium. The specific meaning of the above-mentioned terms in the present disclosure may be understood by those of ordinary skill in the art in light of specific circumstances.

A clothing information processing method is provided in this disclosure, and comprises:

the server receives the clothing information sent by a washing device and saves it;

the server receives request information sent by an intelligent terminal;

the server obtains the corresponding clothing information according to the request information and sends it to the intelligent terminal.

In this disclosure, the server receives the clothing information sent by the washing device and stores the clothing information. In this way, in the whole washing cycle, even after this washing cycle, the user can obtain the clothing information identified by the washing device from the server through the intelligent terminal, which avoids that in the prior art, after the stage of uploading clothing information by the washing device is completed, the intelligent terminal can no longer obtain clothing information.

Embodiment 1

In this embodiment 1, the washing device is communication connected with the server. The washing device is provided with an RFID reader, and the clothes are provided with an RFID electronic tag. In the washing process, the clothing information is obtained by reading the RFID electronic tag on the clothes via the RFID reader, and uploaded to the server by the washing device. After the server receives the clothing information sent by the washing device, index information is set and stored for the clothing information. The intelligent terminal is connected with the server, the intelligent terminal is connected with the server, and the washing machine status information is synchronized. When receiving the request information sent by the intelligent terminal, the server obtains the corresponding clothing information according to the index information and sends it to the corresponding intelligent terminal. The user can obtain the clothing information of each laundry in the current washing cycle via the intelligent terminal.

In this embodiment, the server sets the index information for the clothing information, so that after the server receives the request information of the intelligent terminal, it can quickly obtain the corresponding clothing information according to the index information.

The index information could be set information. After receiving the request information sent by the intelligent terminal, the server indexes and queries the corresponding clothing information according to the set information.

In another scheme, the server receives the clothing information and operation state information uploaded by the washing device, sets the operation state information as the index information of the clothing information. When receiving the request information, the server indexes and queries the corresponding clothing information according to the operation state information index. In this scheme, the server takes the operation state information as the index information, which makes the data storage structure simple and improves the information index rate.

The server receives the real-time operation state information and the identified clothing information uploaded by the washing device, and the clothing information and the operation state information received are related and stored in the server. When receiving the request information, the server indexes and queries the corresponding clothing information according to the operation state information. The server stores the real-time operation state information with the clothing information identified in the corresponding stage, and the storage structure is simple and the data storage is organized. The server can obtain the clothing information uploaded synchronously with the operation state according to the corresponding operation state information.

The washing device is provided with an operation state for identifying the clothing information. In the operation state, the server receives the real-time operation state information and the identified clothing information uploaded by the washing device, and stores the operation state information and the clothing information in association. When receiving the request information, the server indexes and queries the corresponding clothing information according to the operation state information.

Embodiment 2

In this embodiment 2, the server receives the real-time operation state data frame sent by the washing device and the clothing information field uploaded with the real-time operation state data frame, and stores the received clothing information field in turn. When receiving the request information, the server obtains each clothing information field to obtain all clothing information identified in the washing cycle, and sends it to the intelligent terminal. The user can view all clothing information identified in the washing cycle.

Each time the washing device identifies the clothing information of a piece of clothing, the clothing information is uploaded to the server together with the operation state data frame. The server successively stores all clothing information uploaded by the washing device, and when receiving the request information, indexes and queries the clothing information of each piece of clothing respectively and sends it to the intelligent terminal.

The server counts the number of clothes in the process of receiving clothing information. When receiving the request information, the server performs an index query process corresponding times according to the number of clothes to obtain all clothing information in the washing cycle.

The server sets ID numbers for the clothing information of each clothes received in turn, so as to traverse the stored clothing information according to the ID number when receiving the request information, so as to avoid missing the clothing information of certain clothing.

Embodiment 3

In this embodiment 3, when the washing device is in the operation state of identifying clothing information, the server receives the clothing information continuously and circularly uploaded by the washing device. In this operation state, when the server receives the request information of the intelligent terminal, it will directly send clothing information uploaded by the washing device in real time to the intelligent terminal. In this stage, the server directly sends the received clothing information to the intelligent terminal, that is, the intelligent terminal and the server synchronize the clothing information data in real time without calling the interface. In this scheme, the washing device synchronizes the operation state information and clothing information with the intelligent terminal, and the user can view the identified clothing information through the intelligent terminal. However, there is a problem in this scheme: when the intelligent terminal is connected with the server in the operation state of the washing device identifying the clothing information, the intelligent terminal can synchronize the clothing information identified by the washing device, but the intelligent terminal is connected to the server only after the operation state of identifying the clothing information is completed, if the intelligent terminal misses the operation state of the clothing information identified by the washing device, it will no longer be able to obtain the laundry information identified in the washing cycle. Therefore, the scheme in the above embodiments can be adopted to store the clothing information, and the intelligent terminal can obtain the clothing information stored by the server.

Specifically, the server receives the request information after the operation state of identifying the clothing information, then queries the corresponding clothing information from the stored data information and sends it to the intelligent terminal. In this stage, the intelligent terminal obtains the stored clothing information through the corresponding interface.

The server receives and stores the operation state information and clothing information uploaded by the washing device in each washing cycle, and establishes a historical information database of the washing device. After receiving the request information, the server queries the corresponding clothing information from the historical information database and sends it to the intelligent terminal. The server establishes the historical information database of the washing device, which stores the clothing information in each washing cycle. The server can obtain the clothing information of each user's clothes from the historical information database, so as to realize the intelligent management of the user's clothing.

The request information comprises identification information and washing cycle information of the washing device, and the server queries the clothing information identified in the corresponding washing cycle of the corresponding washing device from the historical information database according to the request information and the index information. A large amount of data is stored in the server, which is a multi-layer data structure. For example, the historical information database of the washing device includes the data information of different washing devices, the data information of different washing devices further includes the data information in different washing cycles, and the data information in different washing cycles further includes the different operation state information of the washing device. Wherein the identified clothing information is stored in the operation state information for identifying clothing information, and the server needs to conduct multi-layer data query to obtain the corresponding clothing information.

Referring to FIG. 1, a preferred control step is provided:
S1. The washing device being turned on;
S2. The washing device identifying the clothing information and circularly uploading the identified clothing information to the server;
S3. The intelligent terminal displaying the clothing information uploaded by the washing device in real time;
S4. The process of identifying the clothing information by the washing device being completed, and executing the corresponding washing procedure according to the identified clothing information;
S5. The intelligent terminal connecting to the server again and sending request information to the server;
S6. The server querying the clothing information identified in the corresponding washing cycle from the history information database of washing device according to the request information and indexing information, and sending it to the intelligent terminal;
S7. After receiving the clothing information, the intelligent terminal displaying a prompt to the user.

Embodiment 4

In this embodiment 4, the server receives and stores the operation state information and clothing information uploaded by the washing device in each washing cycle, and establishes the historical information database of the washing device. The historical information database stores the clothing information in each washing cycle, and the server can obtain the clothing information of each user's clothing from the historical information database, so as to realize the intelligent management of the user's clothing.

For example, the server manages the user's clothes and generates dressing suggestion information according to the user's clothing information.

In this embodiment, the server generates clothing suggestion information according to the clothing information of the user's clothes, so as to save the time for the user to match clothes and meet the fashion needs of the user. The user no longer needs to buy an intelligent wardrobe to realize the management of clothes. The washing device can manage the user's clothes and recommend the user's clothing matching scheme.

After purchasing clothes, the user does not need to take them to the washing device for clothes identification. Each time the washing device washes clothes; the washing device automatically identifies the clothing information of the clothes and uploads the clothing information to the server together with the operation state information of the washing device. After receiving information, the server stores the operation state information and the clothing information correspondingly, establishes the historical information database of the washing device. The clothing information in the historical information database of the washing device is all the clothing information of the user, and the server recommends the user's clothing matching scheme based on clothing information in the historical information database.

Embodiment 5

In this embodiment 5, the server can also establish a separate user clothing database, which is independent from the history information database of washing device. In this way, the clothing information storage structure is simple. The information in the user clothing database is derived from the clothing information identified by the washing device each time the clothing is washed, or it can be obtained by extracting the clothing information from the history information database of washing device. Preferably, for example, when the washing device performs the washing task each time, it identifies the clothing information of the clothes to be washed, and the server updates the user clothing database/the history information database of washing device according to the identified clothing information. New clothes are bought by users and need to be washed. During washing, the washing device can identify the clothing information, so as to know whether these clothes washed are new clothes purchased by the user, and then update the user clothing database/the history information database of washing device, and the server generates dressing suggestion information according to the updated clothes database/history information database of washing device. After establishing and improving the user's clothing database/historical information database of the washing device, the server can recommend the user's clothing matching scheme according to the user's clothing inventory.

After the washing device identifies the clothing information of the clothing, the server detects whether there is corresponding clothing information in the user clothing database. If there is corresponding clothing information in the user clothing database, the server gives up updating the user clothing database. Otherwise, the server updates the user clothing database; the server adds corresponding clothing information to the user clothing database. In this process, after identifying the clothing information each time, the server queries whether the user clothing database has the clothing information. If the user clothing database has the clothing information, the user clothing database does not need to be updated. If the user clothing database does not have the clothing information, it indicates that the clothes washed are newly purchased by the user. The server adds the clothing information to the user clothing database to update the user clothing database.

Moreover, in real life, users often abandon some clothes and dispose of them (such as donation), but the clothing information of these clothes are still stored in the uses clothing database, and there are cases where clothes matching schemes are designed according to these clothing information. However, the clothes matching scheme obtained in this way have no substantive significance and affect the design of the whole clothes matching scheme. Therefore, these special clothes need to be deleted to avoid affecting the subsequent dressing recommendations.

One scheme is that the user can directly operate manually. The corresponding clothing information can be edited and deleted through the washing device or the intelligent terminal connected to the server.

The corresponding clothing information could be forgotten to delete by users in the above scheme, so the following scheme is further provided:

The server calculates the time how long each clothes is not washed, judges whether the time when each clothing is not washed is greater than the set value T1, and when the time when each clothing is not washed is greater than the set value T1, deletes the clothing information of the corresponding clothes in the user clothing database. Preferably, T1 is two years. When it is judged that the time when certain clothes are not washed is greater than the set value T1, it is determined that the user has abandoned the corresponding clothes. Therefore, the clothing information of the clothes can be deleted from the user clothing data. This data processing process is automatically executed without the user's participation. When it is judged that the time when a certain clothes is not washed is less than the set value T1, the clothing information of the clothes is retained, and used in the consideration of recommended clothing matching.

Embodiment 6

The scheme that the server recommends clothing matching to user is described in detail in this embodiment 6.

The generation of clothing recommendation information includes: the server selects the recommended clothes to the user to wear based on the clothing information from the user clothing database/history information database of washing device.

Wherein, the server selects the recommended clothes from the user clothing database/history information database of the washing device according to the season information, weather forecast information and dressing fashion information. That is, the server obtains the time information and connects with the meteorological server to obtain the weather forecast information, the server can also connect to other servers on the network to obtain the dressing fashion information of the current season, and generate dressing suggestions according to such information.

According to the characteristics of the washing device, another more preferred scheme is provided:

The server also detects the washing frequency of clothes, obtains the user's dressing habit information according to the washing frequency of clothes, and generates dressing suggestion information according to the user's dressing habit information. The server recommends the user to wear clothes according to the user's dressing habit information, which is more in line with the user's needs and has high user satisfaction.

The step that obtains the user's dressing habit information according to the washing frequency of clothes comprises: the server determines that the clothes with high washing frequency is the clothes with high wearing frequency, and determines that the clothes with low washing frequency is the clothes with low wearing frequency. Clothes with high washing frequency represent the clothes that users wear frequently and like. It is easy to meet the needs of users to recommend clothes matching schemes according to the clothes.

The step that generates dressing suggestion information according to the user's dressing habit information comprises: the server selects the clothing matching combination from clothes whose washing frequency is higher than the set value. The matching scheme is selected among the clothes preferred by the user to meet the user's preferences, and the generated dressing suggestion information is easier to be recognized by the user.

In a preferred embodiment, the server generates a plurality of sets of clothing matching combination information for the user to select. The washing device or the intelligent terminal communicated with the server displays multiple sets of clothing matching combination information, also receives the user's selection of target options, and carries out self-learning according to the user's selection results to obtain the user's clothing style preference, so as to provide the clothing matching scheme according to the user's preference in the later stage. When viewing multiple clothing matching combination information, the user can select the evaluation information according to the dialog box and score different matching schemes. In this way, the server records the user's selection and analyzes the user's preference for matching clothes, so as to give priority to the matching scheme preferred by the user in the later stage.

In addition, users often forget some clothes because they have more clothes. These clothes are stored for a long time, resulting in waste. Therefore, the following scheme is further provided in this embodiment:

The server also queries clothes that have not been washed for a time greater than the set value T2, and generates clothes matching combination information according to the clothing information of the clothes. If a certain item of clothing has not been washed for a long time, the user may forget the clothing. Therefore, the server will prompt the user to wear the clothing at an appropriate time. For example, the clothing matching scheme is designed according to the clothing to prompt the user to wear it, so as to avoid the waste of the clothing.

Embodiment 7

In this embodiment 7, the washing device or server is also used to generate recommendation information prompting the user to wash clothes.

Specifically, the intelligent terminal receives the accepted dressing suggestion selected by the user. After the server detects that the user has accepted one certain dressing suggestion information, the washing device or server calculates the length of time the user wears the corresponding clothes and determines whether the time point for washing is reached. If the judgment result is yes, the washing device/server prompts the user to process the clothes, it also recommends the user's new clothing matching scheme, or the server generates a prompt message prompting the user to process the clothes, and sends the prompt message to the intelligent terminal, which prompts the user with the corresponding prompt message.

The "new clothing matching scheme" defined in the above scheme means that when the server detects that the user has selected to adopt the certain clothing recommendation information, it will prompt the user to process the corresponding clothes, and generate a new clothing matching scheme according to other clothing information in the user clothing database/history information database of washing device to prompt the user to change clothes. This process not only prompts users to wash clothes, but also provides users with new dressing suggestions to serve users in a full range and avoid wasting users' time.

Embodiment 8

In this embodiment 8, the washing device includes a display screen, which displays the dressing suggestion information. The display mode can be to display the text introduction of each garment, such as the brand, style, color, material information of the garment, etc. It can also display pictures of various clothes. The way of displaying pictures is more intuitive. The source of pictures can be taken in advance via the camera on the washing machine or via the intelligent terminal.

The washing device and the intelligent terminal are communicated and connected with the server. The washing device identifies the clothing information and sends it to the server. After receiving it, the server stores and establishes the user clothing database/historical information database of the washing device, and generates clothing suggestion information according to the user clothing database/historical information database of the washing device, and sends the suggestion information to the washing device or to the intelligent terminal, and prompts the user via the washing device or intelligent terminal.

The above are merely preferred embodiments of the present disclosure, rather than restricting the present disclosure in any form. Although the preferred embodiments of the present disclosure are disclosed above, they are not used to restrict the present disclosure. Based on the technical content described above, changes or modifications made by any person skilled in the art without departing from the scope of the technical solution of the present disclosure are equivalently changed equivalent embodiments. For any content without departing from the technical solution of the present disclosure, any simple change, equivalent change and modification made to the above embodiments according to the technical substance of the present disclosure belong to the scope of the solution of the present disclosure.

The invention claimed is:

1. A clothing information processing method, for a washing device connected with a server, the washing device provided with an RFID reader, and clothes provided with an RFID electronic tag, comprising:
   obtaining clothing information by reading the RFID electronic tag on the clothes with the RFID reader;
   uploading the clothing information to the server;
   the server receiving the clothing information sent by the washing device and saving the clothing information;
   the server receiving request information sent by an intelligent terminal;
   the server obtaining the clothing information according to the request information and sending the clothing information to the intelligent terminal; wherein,
   the server receives a data frame of real-time operation state sent by the washing device and clothing information field uploaded with the data frame of the real-time operation state, and stores the received clothing information field;
   when receiving the request information, the server obtains each clothing information field to obtain all clothing information identified in a washing cycle;
   the server counts a number of clothes in a process of receiving the clothing information;
   when receiving the request information, the server performs an index query process corresponding times according to the number of clothes to obtain all clothing information in the washing cycle.

2. The clothing information processing method according to claim 1, wherein the server sets index information for the clothing information after receiving the clothing information sent by the washing device and stores the index information and the clothing information;
   when receiving the request information sent by the intelligent terminal, the server obtains the clothing information according to the index information and sends the clothing information to the intelligent terminal.

3. The clothing information processing method according to claim 2, wherein the server receives the clothing information and operation state information uploaded by the washing device, sets the operation state information as the index information of the clothing information.

4. The clothing information processing method according to claim 3, wherein the washing device is provided with an operation state for identifying the clothing information;
   in the operation state, the server receives the operation state information and the identified clothing information uploaded by the washing device, and stores the operation state information and the clothing information;
   when receiving the request information, the server indexes and queries the clothing information according to the operation state information.

5. The clothing information processing method according to claim 4, wherein the server receives and stores operation state information and clothing information uploaded by the washing device in each washing cycle, and establishes the historical information database of the washing device;
   after receiving the request information, the server queries the clothing information from the historical information database and sends the clothing information to the intelligent terminal.

6. The clothing information processing method according to claim 3, wherein
   the server receives real-time operation state information and identified clothing information uploaded by the washing device, and stores the operation state information and the clothing information;
   when receiving the request information, the server indexes and queries the clothing information according to the operation state information.

7. The clothing information processing method according to claim 2, wherein the server receives the clothing information and operation state information uploaded by the washing device, sets the operation state information as the index information of the clothing information;
   when receiving the request information, the server indexes and queries the clothing information according to the operation state information as the index information.

8. The clothing information processing method according to claim 2, wherein the server receives and stores operation state information and clothing information uploaded by the washing device in each washing cycle, and establishes the historical information database of the washing device;
   after receiving the request information, the server queries the clothing information from the historical information database and sends the clothing information to the intelligent terminal.

9. The clothing information processing method according to claim 1, wherein the server sets an ID number for the clothing information of each clothes received, so as to traverse the stored clothing information according to the ID number when receiving the request information.

10. The clothing information processing method according to claim 9, wherein when the washing device is in the operation state of identifying clothing information, the server receives the clothing information uploaded by the washing device continuously and circularly;

in the operation state, when the server receives the request information, the server directly sends the clothing information uploaded by the washing device in real time to the intelligent terminal;

the server receives the request information after the operation state of identifying the clothing information is over, then queries the clothing information from the stored data information and sends the clothing information to the intelligent terminal.

11. The clothing information processing method according to claim 1, wherein when the washing device is in an operation state of identifying clothing information, the server receives the clothing information uploaded by the washing device continuously;

in the operation state, when the server receives the request information, the server directly sends the clothing information uploaded by the washing device in real time to the intelligent terminal;

the server receives the request information after the operation state of identifying the clothing information is over, then queries the clothing information from the stored data information and sends the clothing information to the intelligent terminal.

12. The clothing information processing method according to claim 11, wherein the server receives and stores operation state information and clothing information uploaded by the washing device in each washing cycle, and establishes the historical information database of the washing device;

after receiving the request information, the server queries the clothing information from the historical information database and sends the clothing information to the intelligent terminal.

13. The clothing information processing method according to claim 1, wherein the server receives and stores operation state information and clothing information uploaded by the washing device in each washing cycle, and establishes the historical information database of the washing device;

after receiving the request information, the server queries the clothing information from a historical information database and sends the clothing information to the intelligent terminal.

14. The clothing information processing method according to claim 13, wherein the request information comprises identification information and washing cycle information of the washing device, and the server queries the clothing information identified in the corresponding washing cycle of the corresponding washing device from the historical information database according to the request information and index information.

15. The clothing information processing method according to claim 1, wherein each time the washing device identifies the clothing information of a piece of clothing, the clothing information is uploaded to the server together with the data frame of the operation state;

the server successively stores all the clothing information uploaded by the washing device, and when receiving the request information, the server indexes and queries the clothing information of each piece of clothing respectively and sends the clothing information to the intelligent terminal.

16. The clothing information processing method according to claim 2, wherein when the washing device is in the operation state of identifying clothing information, the server receives the clothing information uploaded by the washing device continuously and circularly;

in the operation state, when the server receives the request information, the server directly sends the clothing information uploaded by the washing device in real time to the intelligent terminal;

the server receives the request information after the operation state of identifying the clothing information is over, then queries the clothing information from the stored data information and sends the clothing information to the intelligent terminal.

\* \* \* \* \*